US010757678B2

(12) United States Patent
Drevö et al.

(10) Patent No.: US 10,757,678 B2
(45) Date of Patent: Aug. 25, 2020

(54) DEVICES AND METHODS FOR ENABLING MATCHING PAGING OCCASIONS FOR A LIGHTLY CONNECTED WIRELESS DEVICE

(71) Applicant: TELEFONAKTIEBOLAGET LM ERICSSON (PUBL), Stockholm (SE)

(72) Inventors: Markus Drevö, Linköping (SE); Rasmus Axén, Linköping (SE); Paul Schliwa-Bertling, Ljungsbro (SE); Gunnar Mildh, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/346,866

(22) PCT Filed: Nov. 1, 2017

(86) PCT No.: PCT/IB2017/056790
§ 371 (c)(1),
(2) Date: May 1, 2019

(87) PCT Pub. No.: WO2018/083605
PCT Pub. Date: May 11, 2018

(65) Prior Publication Data
US 2019/0320412 A1 Oct. 17, 2019

Related U.S. Application Data

(60) Provisional application No. 62/415,820, filed on Nov. 1, 2016.

(51) Int. Cl.
H04W 76/30 (2018.01)
H04W 68/00 (2009.01)
(Continued)

(52) U.S. Cl.
CPC ............ *H04W 68/005* (2013.01); *H04L 5/14* (2013.01); *H04W 4/70* (2018.02); *H04W 36/30* (2013.01);
(Continued)

(58) Field of Classification Search
CPC ............ H04W 74/0833; H04W 76/15; H04W 36/0077; H04W 36/08; H04W 60/04;
(Continued)

(56) References Cited

U.S. PATENT DOCUMENTS

2014/0302874 A1* 10/2014 Zakrzewski ............ H04W 4/70
455/456.1
2015/0365914 A1* 12/2015 Yu .......................... H04W 68/02
455/458
2019/0297510 A1* 9/2019 Maeda ................... H04W 48/12

OTHER PUBLICATIONS

CATT, Paging for lightly connected UE, R3-162168, 3GPP TSG RAN WG3 Meeting #93bis, Antipolis, France, Oct. 10-14, 2016.
(Continued)

Primary Examiner — Tu X Nguyen

(57) ABSTRACT

According to certain embodiments, a method by a first network node is provided for enabling paging of a user equipment (UE) in an inactive state. The method includes the first network node receiving a UE identity index value for the UE while the UE is in a connected state or during an initial context setup for the UE. The UE identity index value is stored. The method further includes transitioning the UE from the connected state to an inactive state and using the UE identity index value that was stored while the UE was in the connected state to initiate a transmission of a page to the UE in the inactive state.

24 Claims, 12 Drawing Sheets

(51) Int. Cl.
  H04W 4/70    (2018.01)
  H04L 5/14    (2006.01)
  H04W 36/30   (2009.01)
  H04W 68/02   (2009.01)
  H04W 72/02   (2009.01)
  H04W 72/04   (2009.01)
(52) U.S. Cl.
  CPC ........... *H04W 68/02* (2013.01); *H04W 72/02* (2013.01); *H04W 72/0406* (2013.01)
(58) Field of Classification Search
  CPC ......... H04W 36/0061; H04W 36/0083; H04W 36/00835; H04W 68/00; H04W 68/12; H04W 40/246; H04W 68/08; H04W 76/10; H04W 76/30; H04W 92/045; H04B 7/0626
  USPC ...................................................... 455/412.2
  See application file for complete search history.

(56) References Cited

OTHER PUBLICATIONS

Huawei, S1 impacts for Light Connection, R3-162160, 3GPP TSG-RAN3 Meeting #93, Sophia-Antipolis, France, Oct. 10-14, 2016.
Huawei, et al., Procedures for moving within RAN based Paging Area, R3-162156, 3GPP TSG-RAN3 Meeting #93, Sophia-Antipolis, France, Oct. 10-14, 2016.
CATT, Discussion on RAN initiated paging, R3-161622, 3GPP TSG RAN WG3 Meeting #93, Gothenburg, Sweden, Aug. 22-26, 2016.
Nokia, et al., Feedback to RAN2#95 agreements and open issues, R3-162415, 3GPP TSG-RAN WG3 Meeting #93bis, Sophia-Antipolis, France, Oct. 10-14, 2016.
Samsung, The required feature analysis for the RAN initiated paging, R3-161653, 3GPP TSG-RAN WG3 #93, Gothenburg, Sweden, Aug. 22-26, 2016.
LG Electronics Inc., Discussion on paging for a lightly connected UE, R3-161930, 3GPP TSG-RAN WG3 #93, Gothenburg, Sweden, Aug. 22-26, 2016.
3rd Generation Partnership Project; Technical Specification Group Radio Access Network; Evolved Universal Terrestrial Radio Access (E-UTRA); User Equipment (UE) procedures in idle mode (Release 13) 3GPP TS 36.304 V13.2.0 (Jun. 2016).
3rd Generation Partnership Project; Technical Specification Group Radio Access Network; Evolved Universal Terrestrial Radio Access Network (E-UTRAN); S1 Application Protocol (S1AP) (Release 13) 3GPP TS 36.413 V13.2.0 (Mar. 2016).
3rd Generation Partnership Project; Technical Specification Group Radio Access Network; Evolved Universal Terrestrial Radio Access Network (E-UTRAN); X2 application protocol (X2AP) (Release 13) 3GPP TS 36.423 V13.3.0 (Mar. 2016).

* cited by examiner

US 10,757,678 B2

DEVICES AND METHODS FOR ENABLING MATCHING PAGING OCCASIONS FOR A LIGHTLY CONNECTED WIRELESS DEVICE

PRIORITY

This application claims priority to U.S. Patent Provisional Application No. 62/415,820 filed on Nov. 1, 2016, entitled "ENABLING MATCHING PAGING OCCASIONS FOR INACTIVE UE," the disclosure of which is hereby incorporated by reference.

This application is a 371 of International Application No. PCT/IB2017/056790, filed Nov. 1, 2017, the disclosure of which is fully incorporated herein by reference.

TECHNICAL FIELD

The present disclosure relates, in general, to wireless communications and, more particularly, systems and methods for enabling matching paging occasions for an inactive wireless device.

BACKGROUND

In 3GPP Release 14, the concept of a lightly connected user equipment (UE) or wireless device is introduced. A lightly connected UE may look like it is in ECM connected from the perspective of the core network (e.g., an MME). The lightly connected UE may also have idle mode behavior in the radio access network (RAN) and, thus, may perform mobility between cells in the same base station or to cells on other base stations without informing the network.

The RAN and/or the base stations in the RAN have the responsibility to find a lightly connected UE when needed. For example, the RAN may need to find a lightly connected UE when user data is received by the base station or when the base station needs to transmit control plane related signaling such as a NAS message. A base station may request another base station to page the UE via a direct interface between two base stations such as the X2 interface in LTE.

In order to save battery, the UE only listens to paging at specified times derived from the UE identity index value. In LTE, when a UE is ECM_IDLE, the UE identity index value is sent to the base station from the core network in a paging message. From this information, the paging occasions are calculated. This is described in TS 36.304, which is quoted in part below:

PF, PO, and PNB are determined by following formulae using the DRX parameters provided in System Information:

PF is given by following equation:

$SFN \bmod T = (T \text{ div } N)*(UE\_ID \bmod N)$

Index i_s pointing to PO from subframe pattern defined in 7.2 will be derived from following calculation:

$i\_s = \text{floor}(UE\_ID/N) \bmod Ns$

If P-RNTI is monitored on MPDCCH, the PNB is determined by the following equation:

$PNB = \text{floor}(UE\_ID/(N*Ns)) \bmod Nn''$

The UE_ID is the UE identity index value. The PF is the paging frame, which may be 10 milliseconds or 10 subframes in LTE. The PO is the paging occasion and identifies the particular subframe in a frame for transmission of a page. The PNB is the paging narrowband on which the UE performs the paging message reception.

While in a lightly connected state or inactive state, there may be a need for a base station to page the UE. Unfortunately, however, a base station triggering paging of an inactive UE does not have sufficient information to calculate when a UE camping on is listening for paging since the base station does not need the UE_ID for a UE in connected mode.

SUMMARY

To address the foregoing problems with existing solutions, disclosed is systems and methods for enabling matching paging occasions for an inactive wireless device.

According to certain embodiments, a method by a first network node is provided for enabling paging of a user equipment (UE) in an inactive state. The method includes the first network node receiving a UE identity index value for the UE while the UE is in a connected state or during an initial context setup for the UE. The UE identity index value is stored. The method further includes transitioning the UE from the connected state to an inactive state. The first network node may then use the UE identity index value to determine a paging occasion and transmit the page to the UE at the paging occasion.

According to certain embodiments, a first network node is provided for enabling paging of a user equipment (UE) in an inactive state. The first network node includes memory storing instructions and processing circuitry configured to execute the instructions to cause the first network node to receive a UE identity index value for the UE while the UE is in a connected state or during an initial context setup for the UE. The first network node stores the UE identity index value. The UE is transitioned from the connected state to an inactive state, and the first network node uses the UE identity index value to determine a paging occasion and transmit a page to the UE at the paging occasion.

According to certain embodiments, a method by a first network node is provided for paging a UE in an inactive state. The method includes receiving, from a second network node, a UE identity index value for the UE in the inactive state. The first network node uses the UE identity index value to determine a paging occasion for transmitting a page to the UE in the inactive state. At the paging occasion, the first network node transmits the page to the UE in the inactive state.

According to certain embodiments, a first network node is provided for paging a UE in an inactive state. The first network node includes memory storing instructions and processing circuitry configured to execute the instructions to cause the first network node to receive, from a second network node, a UE identity index value for the UE in the inactive state. The UE identity index value is used to determine a paging occasion for transmitting a page to the UE in the inactive state. At the paging occasion, the page is transmitted to the UE in the inactive state.

According to certain embodiments, a method by a UE is provided for receiving a page while in an inactive state. The method includes transmitting a UE identity index value to a network node. Based on the UE identity index value, a paging occasion for receiving a page from the network node is determined. At the paging occasion determined based on the UE identity index value, the UE listens for the page from the network node.

According to certain embodiments, a UE is provided for receiving a page while in an inactive state. The UE includes storage storing instructions and processing circuitry configured to execute the instructions to cause the UE to transmit a UE identity index value to a network node. Based on the UE identity index value, a paging occasion for receiving a page from the network node is determined. At the paging occasion determined based on the UE identity index value, the UE listens for the page from the network node.

Certain embodiments of the present disclosure may provide one or more technical advantages. For example, certain embodiments may enable the matching of paging occasions by a network node transmitting a page to a UE while the UE is in an inactive state. For example, in a particular embodiment when the radio access network (RAN) is responsible for triggering a paging message, a base station may calculate the time when a UE is listening for paging. Another advantage may be that certain embodiments enable a network node such as a base station to indicate the time when the UE is listening for paging to another base station and request the other base station to page the UE. Still another advantage may be that certain embodiments make it possible to use the same paging occasions for RAN network-triggered paging as for core node-triggered paging since the same UE identity index value is used. Such techniques may optimize the battery performance of UEs that are receiving both RAN and core node paging.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
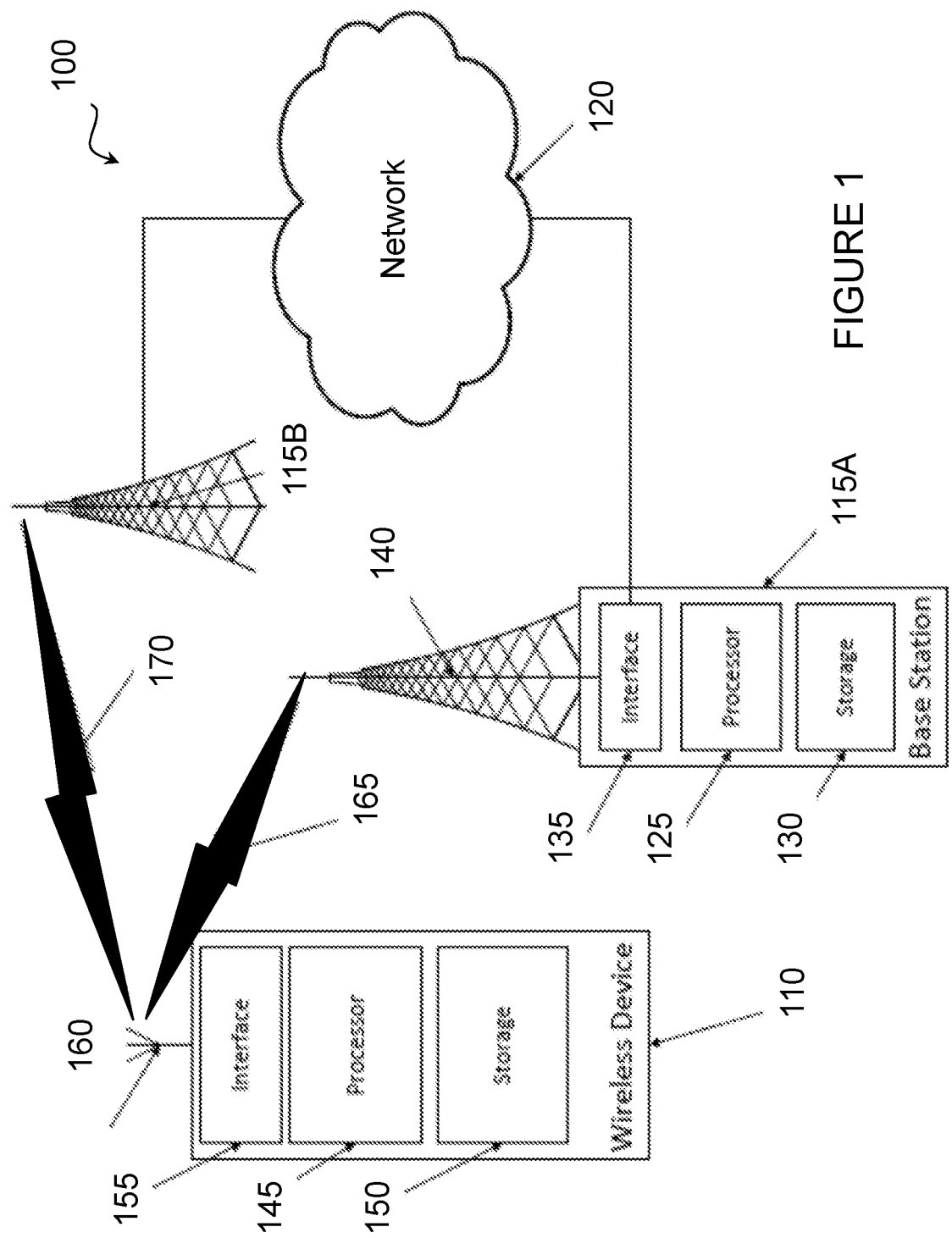
FIG. 1 illustrates an exemplary network for enabling paging of a user equipment (UE) in an inactive state, in accordance with certain embodiments.

Particular embodiments of the present disclosure may provide solutions enabling the matching of paging occasions by a network node transmitting a page to a user equipment (UE) while the UE is in an inactive state.

According to certain embodiments, a core network node, which may operate as a mobile management entity (MME), may provide a UE identity index value to a network node, which may include a base station, while a UE is in connected stated. In a particular embodiment, the UE identity index value may be provided over a core network (CN) or Radio access network (RAN) interface connection. If at a later stage the UE is paged without core network involvement such as by using a direct interface such as the X2 interface, the UE identity index value may be included in the paging request message sent to a neighboring network nodes (i.e., base stations). In other embodiments, the UE may provide the UE identity index value to the network node. Furthermore, following the reception of the UE identity index value from the CN, the UE identity index value may be stored in the UE Context in RAN during the time the UE is in connected state and when in Lightly Connected state. Thus the UE identity index value may be moved from one RAN node (one RAN location) to another RAN node when UE moves across the area changing the serving RAN nodes by means for UE Context transfer.

Accordingly, certain embodiments may allow, for example, a base station to calculate the time when the UE listens for paging when RAN is responsible for triggering the paging message (which is the case for inactive UEs). It may also enable a base station to indicate the time another base station requested to page the UE. It may also make it possible to use the same paging occasions for RAN triggered paging as for CN-triggered paging since the same UE identity index value is used. As such, certain embodiments may optimize battery performance of UEs that are receiving both RAN and CN paging.

According to certain embodiments, a network node may request another network node to page a UE in inactive mode. In a particular embodiment, for example, a base station may request another base station to page the UE. Unless the UE identity index value is provided to the base station which shall page the UE, the paging message is unlikely to be sent when the UE is listening for paging. Accordingly, certain embodiments described herein provide the UE identity index value to the base station that is to do the paging so that the base station is able to determine when to send the paging message.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc."

are to be interpreted openly as referring to at least one instance of the element, apparatus, component, means, step, etc., unless explicitly stated otherwise. The steps of any method disclosed herein do not have to be performed in the exact order disclosed, unless explicitly stated.

Particular embodiments are described in FIGS. 1-12 of the drawings, like numerals being used for like and corresponding parts of the various drawings. Although the solutions described herein may be implemented in any appropriate type of network or system using any suitable components, FIG. 1 illustrates an exemplary network 100 for enabling paging of a UE in an inactive state, in accordance with certain embodiments.

In the example embodiment of FIG. 1, the wireless communication network 100 provides communication and other types of services to one or more wireless devices 110. In the illustrated embodiment, the wireless communication network 100 includes one or more instances of network nodes 115 that facilitate the wireless devices' access to and/or use of the services provided by the wireless communication network 100. The wireless communication network 100 may further include any additional elements suitable to support communication between wireless devices 110 or between a UE 110 and another communication device, such as a landline telephone.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network 100 may represent any type of communication, telecommunication, data, cellular, and/or radio network or other type of system. In particular embodiments, the wireless communication network 100 may be configured to operate according to specific standards or other types of predefined rules or procedures. Thus, particular embodiments of the wireless communication network 100 may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

FIG. 1 illustrates a detailed view of network node 115 and UE 110, in accordance with a particular embodiment. For simplicity, FIG. 1 only depicts network 120, network nodes 115 and 115A, and UE 110. Network node 115 comprises processor 125, storage 130, interface 135, and antenna 140. Similarly, UE 110 comprises processor 145, storage 150, interface 155 and antenna 160. These components may work together in order to provide network node and/or wireless device functionality, such as providing wireless connections in a wireless communication network 100. In different embodiments, the wireless communication network 100 may comprise any number of wired or wireless networks, network nodes, base stations, controllers, wireless devices, relay stations, and/or any other components that may facilitate or participate in the communication of data and/or signals whether via wired or wireless connections.

As used herein, "network node" refers to equipment capable, configured, arranged and/or operable to communicate directly or indirectly with a UE 110 and/or with other equipment in the wireless communication network 100 that enable and/or provide wireless access to the UE 110. Examples of network nodes 115 include, but are not limited to, access points (APs), in particular radio access points. In a particular embodiment, a network node 115 may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. "Network node" also includes one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a network node 115 may be a relay node or a relay donor node controlling a relay.

Yet further examples of network nodes 115 include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes 115 may represent any suitable device (or group of devices) capable, configured, arranged, and/or operable to enable and/or provide a UE 110 access to the wireless communication network 100 or to provide some service to a wireless device that has accessed the wireless communication network 100.

As used herein, the term "radio node" may be used generically to refer both to wireless devices 110 and network nodes 115, as each is respectively described herein.

As represented in FIG. 1 and described above, network node 115 includes processor 125, storage 130, interface 135, and antenna 140. These components are depicted as single boxes located within a single larger box. In practice however, a network node 115 may comprise multiple different physical components that make up a single illustrated component. For example, interface 135 may comprise terminals for coupling wires for a wired connection and a radio transceiver for a wireless connection. As another example, network node 200 may be a virtual network node in which multiple different physically separate components interact to provide the functionality of network node 115. For example, processor 125 may comprise three separate processors located in three separate enclosures, where each processor is responsible for a different function for a particular instance of network node 115. Similarly, network node 115 may be composed of multiple physically separate components. For example, network node 115 may be composed of a NodeB component and a RNC component, a BTS component and a BSC component, or other suitable components, which may each have their own respective processor, storage, and interface components. In certain scenarios in which network node 115 comprises multiple separate components such as, for example, BTS and BSC components, one or more of the separate components may be shared among several network nodes 115. For example, a single RNC may control multiple NodeB's. In such a scenario, each unique NodeB and BSC pair, may be a separate network node 115.

In some embodiments, network node 115 may be configured to support multiple radio access technologies (RATs). In such embodiments, some components may be duplicated. For example, network node 115 may include a separate storage 130 for the different RATs. Additionally or alternatively, some components may be reused. For example, the same antenna 140 may be shared by the RATs, in a particular embodiment.

Processor 125 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 115 components, such as storage 130, network node 115 functionality. For example, processor 125 may execute instructions stored in storage 130. Such functionality may include providing various wireless features discussed herein to a UE 110 including any of the features or benefits disclosed herein.

Storage 130 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 130 may store any suitable instructions, data or information, including software and encoded logic, utilized by network node 115. Storage 130 may be used to store any calculations made by processor 125 and/or any data received via interface 135.

Network node 115 also comprises interface 135 which may be used in the wired or wireless communication of signaling and/or data between network node 115, network 115a, and/or UE 110. For example, interface 135 may perform any formatting, coding, or translating that may be needed to allow network node 115 to send and receive data from network 120 over a wired connection. Interface 135 may also include a radio transmitter and/or receiver that may be coupled to or a part of antenna 140. The radio may receive digital data that is to be sent out to other network nodes or wireless devices via a wireless connection. The radio may convert the digital data into a radio signal having the appropriate channel and bandwidth parameters. The radio signal may then be transmitted via antenna 140 to the appropriate recipient such as, for example, UE 110, in a particular embodiment.

Antenna 140 may be any type of antenna capable of transmitting and receiving data and/or signals wirelessly. In some embodiments, antenna 140 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged and/or operable to communicate wirelessly with network nodes 115 and/or another UE 110. Communicating wirelessly may involve transmitting and/or receiving wireless signals using electromagnetic signals, radio waves, infrared signals, and/or other types of signals suitable for conveying information through air. In particular embodiments, wireless devices 110 may be configured to transmit and/or receive information without direct human interaction. For instance, a UE 110 may be designed to transmit information to a network on a predetermined schedule, when triggered by an internal or external event, or in response to requests from the network. Generally, a UE 110 may represent any device capable of, configured for, arranged for, and/or operable for wireless communication, for example radio communication devices. Examples of wireless devices 110 include, but are not limited to, UE such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device may represent a UE configured for communication in accordance with one or more communication standards promulgated by the $3^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The UE 110 may support device-to-device (D2D) communication, for example by implementing a 3GPP standard for sidelink communication, and may in this case be referred to as a D2D communication device.

As yet another specific example, in an Internet of Things (IoT) scenario, a UE 110 may represent a machine or other device that performs monitoring and/or measurements, and transmits the results of such monitoring and/or measurements to another wireless device and/or a network node. The UE 110 may in this case be a machine-to-machine (M2M) device, which may in a 3GPP context be referred to as a machine-type communication (MTC) device. As one particular example, the UE 110 may be a UE implementing the 3GPP narrow band internet of things (NB-IoT) standard. Particular examples of such machines or devices are sensors, metering devices such as power meters, industrial machinery, or home or personal appliances such as, for example, refrigerators, televisions, personal wearables such as watches, and other devices. In other scenarios, a UE 110 may represent a vehicle or other equipment that is capable of monitoring and/or reporting on its operational status or other functions associated with its operation.

A UE 110 as described above may represent the endpoint of a wireless connection, in which case the device may be referred to as a wireless terminal. Furthermore, a UE 110 as described above may be mobile, in which case it may also be referred to as a mobile device or a mobile terminal.

As depicted in FIG. 1, UE 110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 115 and/or other wireless devices. UE 110 comprises processor 145, storage 150, interface 155, and antenna 160. Like network node 115, the components of UE 110 are depicted as single boxes located within a single larger box, however in practice a UE 110 may comprises multiple different physical components that make up a single illustrated component. For example, storage 150 may comprise multiple discrete microchips, each microchip representing a portion of the total storage capacity.

Processor 145 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other UE 110 components, such as storage 150, to provide UE 110 functionality. Such functionality may include providing various wireless features discussed herein, including any of the features or benefits disclosed herein.

Storage 150 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 150 may store any suitable data, instructions, or information, including software and encoded logic, utilized by UE 110. Storage 150 may be used to store any calculations made by processor 145 and/or any data received via interface 155.

Interface 155 may be used in the wireless communication of signaling and/or data between UE 110 and network node 115. For example, interface 115 may perform any formatting, coding, or translating that may be needed to allow UE 110 to send and receive data from network node 115 over a wireless connection. Interface 155 may also include a radio transmitter and/or receiver that may be coupled to or a part of antenna 160. The radio may receive digital data that is to be sent out to network node 115 via a wireless connection. The radio may convert the digital data into a radio signal having the appropriate channel and bandwidth parameters. The radio signal may then be transmitted via antenna 160 to network node 115.

Antenna 160 may be any type of antenna capable of transmitting and receiving data and/or signals wirelessly. In some embodiments, antenna 160 may comprise one or more omni-directional, sector or panel antennas operable to transmit/receive radio signals between 2 GHz and 66 GHz. For simplicity, antenna 160 may be considered a part of interface 155 to the extent that a wireless signal is being used.

In certain embodiments, network nodes 115 may interface with a radio network controller (not depicted in FIG. 1). The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless devices 110. Wireless devices 110 may exchange certain signals with the core network node using the non-access stratum layer. In non-access stratum signaling, signals between wireless devices 110 and the core network node may be transparently passed through the radio access network. In certain embodiments, network nodes 115 may interface with one or more network nodes over an internode interface. For example, network nodes 115 and 115A may interface over an X2 interface.

Figure 4:
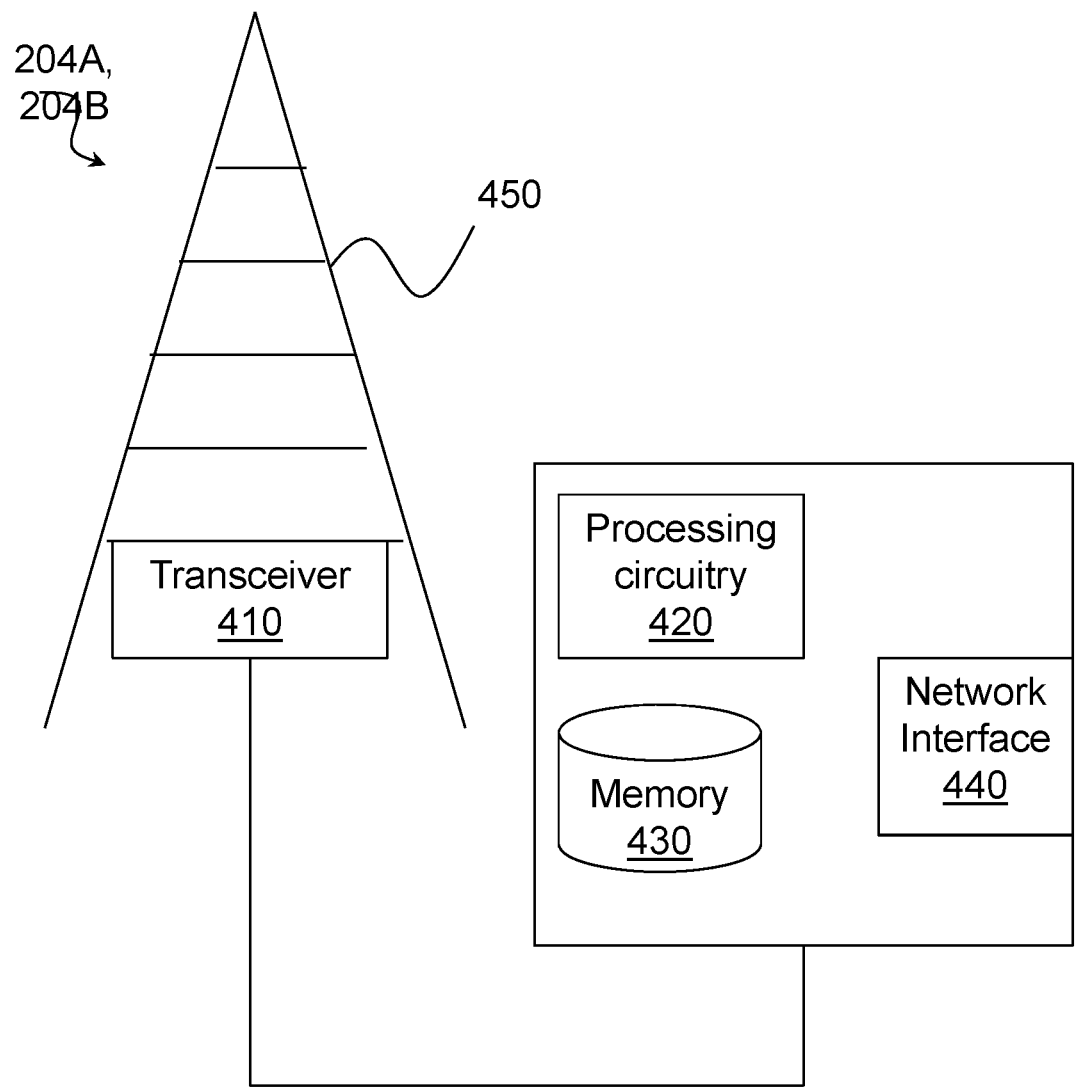
FIG. 4 illustrate an exemplary network node for enabling paging of a UE in an inactive state, according to certain embodiments.
Figure 9:
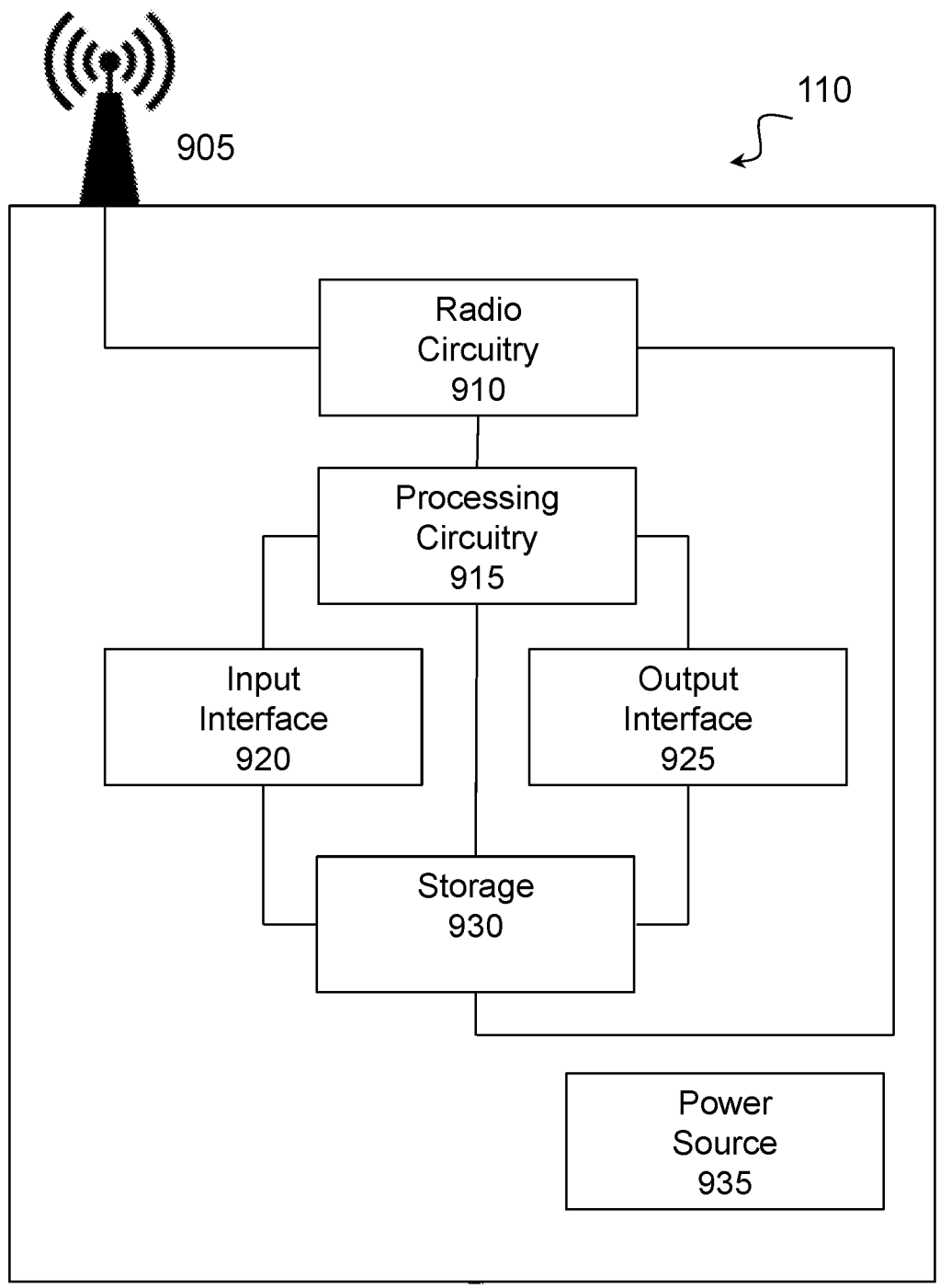
FIG. 9 illustrates an exemplary UE for receiving a page while in an inactive state, in accordance with certain embodiments.
Figure 12:
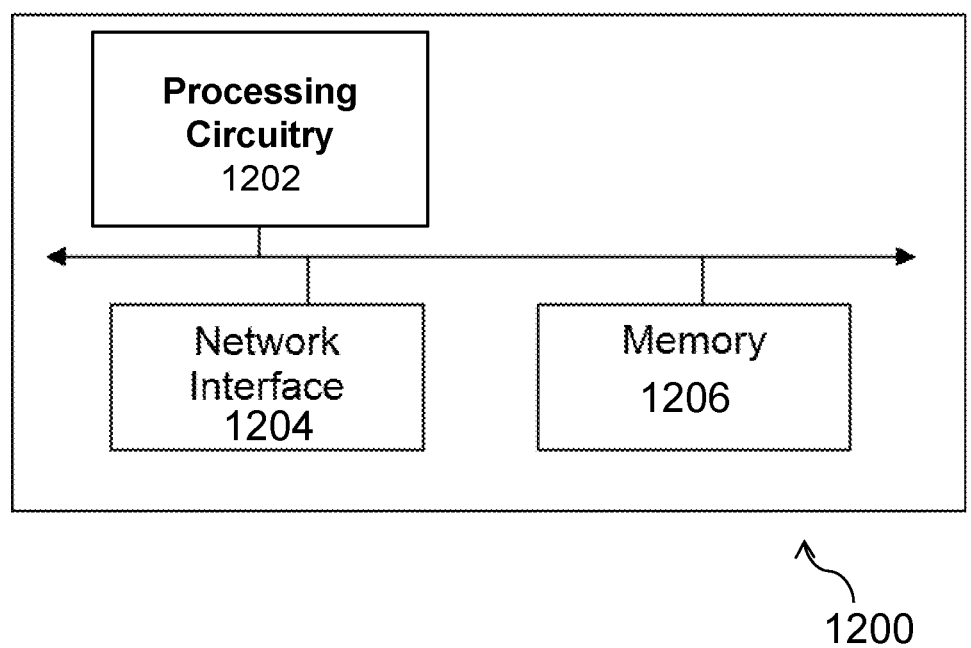
FIG. 12 illustrates an exemplary radio network controller or core network node, in accordance with certain embodiments.

Other example embodiments of network nodes 115, wireless devices 110, and other network nodes (such as radio network controller or core network node) are described in more detail with respect to FIGS. 4, 9, and 12, respectively.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described as implemented in a long term evolution (LTE) network, the embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). For example, the various embodiments described herein may be applicable to LTE, LTE-Advanced, LTE-U UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink and vice versa.

The techniques described herein are applicable to both LAA LTE and standalone LTE operation in license-exempt channels. The described techniques are generally applicable for transmissions from both network nodes 115 and wireless devices 110.

Figure 2:
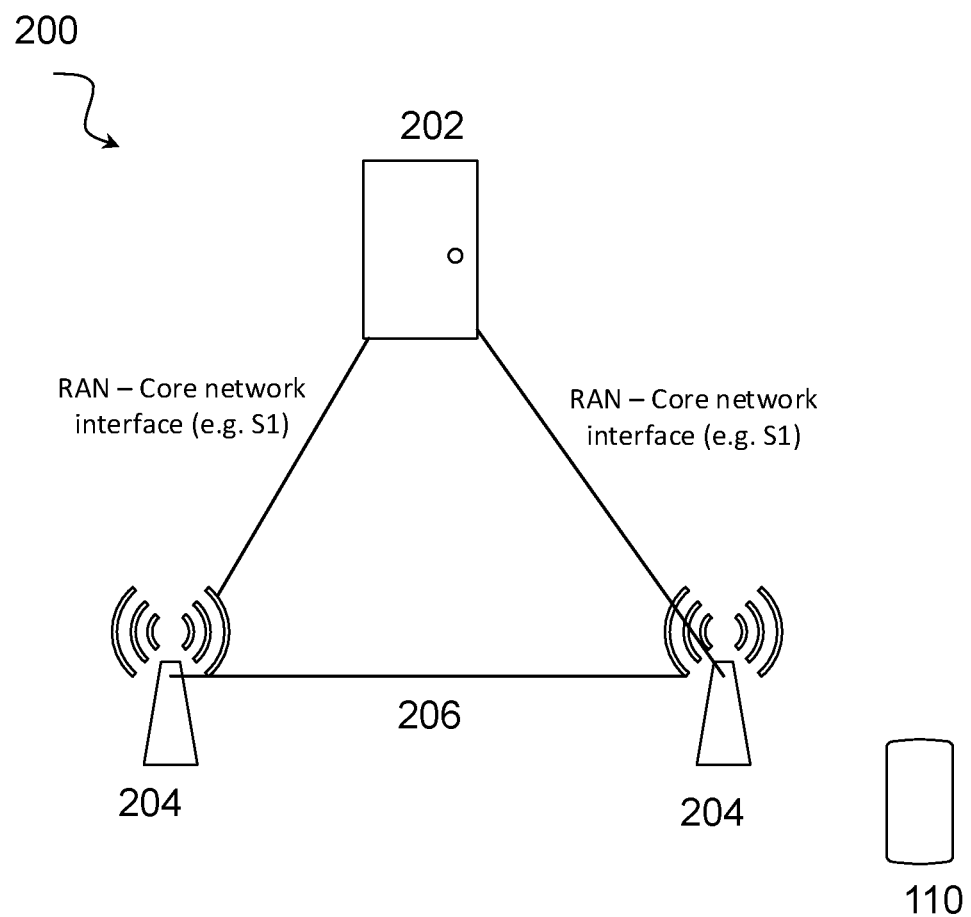
FIG. 2 illustrates an exemplary portion of a network for enabling paging of a UE in an inactive state, in accordance with certain embodiments.

FIG. 2 illustrates an exemplary portion of a network 200 for enabling paging of a UE 110 in an inactive state, in accordance with certain embodiments. As depicted, the portion of the network 200 includes a core network node 202 and two network nodes 204A-B, which may include base stations. Between network node 204A and network node 204B, a direct interface 206 exists. The direct interface 206 may be referred to as an X2 interface, in particular embodiments. The direct interface may be referred to as an S1 interface for LTE, in a particular embodiment. For 5G NR, the direct interface may be referred to as N2 or NG-C. In a particular embodiment, UE 110 has been configured to inactive mode by network node 204A, which has the UE context associated with the inactive UE 110. In a particular embodiment, the UE identity index value (UE_ID) may be calculated based on the International Mobile Subscriber Identity (IMSI) as discussed in TS 36.304 as follows:

UE_ID:
  IMSI mod 1024, if P-RNTI is monitored on PDCCH.
  IMSI mod 4096, if P-RNTI is monitored on NPDCCH.
  IMSI mod 16384, if P-RNTI is monitored on MPDCCH.

According to certain embodiments, the IMSI may be known to UE 110 and the core network node 202. Due to security reasons, however, the IMSI is generally not available to network nodes 204A-B. In legacy networks such as those networks not supporting inactive UEs, the core network always pages the UE and always includes the UE identity index value in the paging message. Since the network nodes 204A-B do not have the IMSI or the UE identity index value, network nodes 204A-B are not able to associate a page with a UE connecting to the network. In the case of inactive UEs, they may rarely be paged by the core network. Thus, to provide mobility between base stations, this information may be made available to a new base station.

According to certain LTE embodiments, several messages may be used to convey the UE_ID to network nodes 204A and/or 204B. Some examples of messages in S1AP 2 of TS36.413 where the UE identity index value may be sent include:
  Initial Context Setup Request
  Downlink NAS Transport
  Handover Request
  Path Switch Request Acknowledge According to certain embodiments, the UE identity index value may be alternatively or additionally provided on the direct interface 206 between network node 204A and network node 204B. As discussed above and in TS 36.423, in LTE, the direct interface 206 is the X2 interface. In a particular embodiment, the UE identity index value may be transferred via the direct interface 206 when the UE context is moved. Examples of messages which may be used include a Handover Request and/or a Retrieve UE Context Response.

In particular embodiments, core network 202 may send the UE identity index value to network node 204A and/or 204B. In another embodiment, a network node 204A or 204B may provide the UE identity index value to the other of network node 204A or 204B. In still other embodiments, UE 110 may additionally or alternatively provide the UE identity index value to network node 204A and/or 204B.

Figure 3:
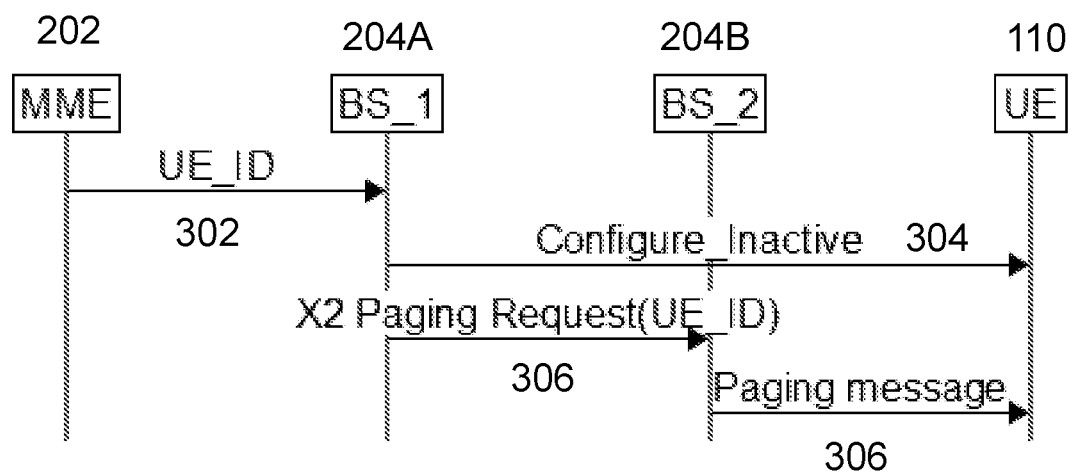
FIG. 3 illustrates an exemplary sequence diagram for enabling paging of a UE in an inactive state, in accordance with certain embodiments.

FIG. 3 illustrates an exemplary sequence diagram for enabling paging of a UE 110 in an inactive state, in accordance with certain embodiments. In the particular depicted embodiments, first network node 204A and second network node 204B are first and second base stations (BS1 and BS2), respectively.

At 302, the UE identity index value is provided to first network node 204A (BS1). At 304, first network node 204A (BS1) configures UE 110 to inactive mode. When first network node 204A (BS1) receives an indication that UE 110 needs to be contacted, first network node 204A (BS1) pages the UE 110.

As depicted in FIG. 3, first network node 204A (BS1) may additionally or alternatively send, at 306, a request to second network node 204B (BS2) to request second network node 204B (BS2) to page UE 110. In such an embodiment, the UE identity index value may be included in the X2 Paging Request transmitted to second network node 204B (BS2) to enable second network node 204B (BS2) to calculate when UE 110 shall be paged. The paging message is sent from second network node 204B (BS2) to the UE 110 at 308.

FIG. 4 illustrate another example network node 204A-B for enabling paging of a UE 110 in an inactive state, according to certain embodiments. As described above, network node 204A-B may be any type of radio network node or any network node that communicates with a wireless device and/or with another network node. Examples of a network node 204A-B are provided above.

Network nodes 204A-B may be deployed throughout network 100 as a homogenous deployment, heterogeneous deployment, or mixed deployment. A homogenous deployment may generally describe a deployment made up of the same (or similar) type of network nodes 204A-B and/or similar coverage and cell sizes and inter-site distances. A heterogeneous deployment may generally describe deployments using a variety of types of network nodes 204A-B having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 204A-B may include one or more of transceiver 410, processor 420, memory 430, and network interface 440. In some embodiments, transceiver 410 facilitates transmitting wireless signals to and receiving wireless signals from UE 110 (e.g., via an antenna), processor 420 executes instructions to provide some or all of the functionality described above as being provided by a network node 204A-B, memory 430 stores the instructions executed by processor 420, and network interface 440 communicates signals to backend network components, such as a gateway, switch, router, Internet, Public Switched Telephone Network (PSTN), core network nodes or radio network controllers, etc.

In certain embodiments, network node 204A-B may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processor 420 may include any suitable combination of hardware and software implemented in one or more modules to execute instructions and manipulate data to perform some or all of the described functions of network node 204A-B. In some embodiments, processor 420 may include, for example, one or more computers, one or more central processing units (CPUs), one or more microprocessors, one or more applications, and/or other logic.

Memory 430 is generally operable to store instructions, such as a computer program, software, an application including one or more of logic, rules, algorithms, code, tables, etc. and/or other instructions capable of being executed by a processor. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 440 is communicatively coupled to processor 420 and may refer to any suitable device operable to receive input for network node 204A-B, send output from network node 204A-B, perform suitable processing of the input or output or both, communicate to other devices, or any combination of the preceding. Network interface 440 may include appropriate hardware (e.g., port, modem, network interface card, etc.) and software, including protocol conversion and data processing capabilities, to communicate through a network.

Other embodiments of network node 400 may include additional components beyond those shown in FIG. 4 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 5:
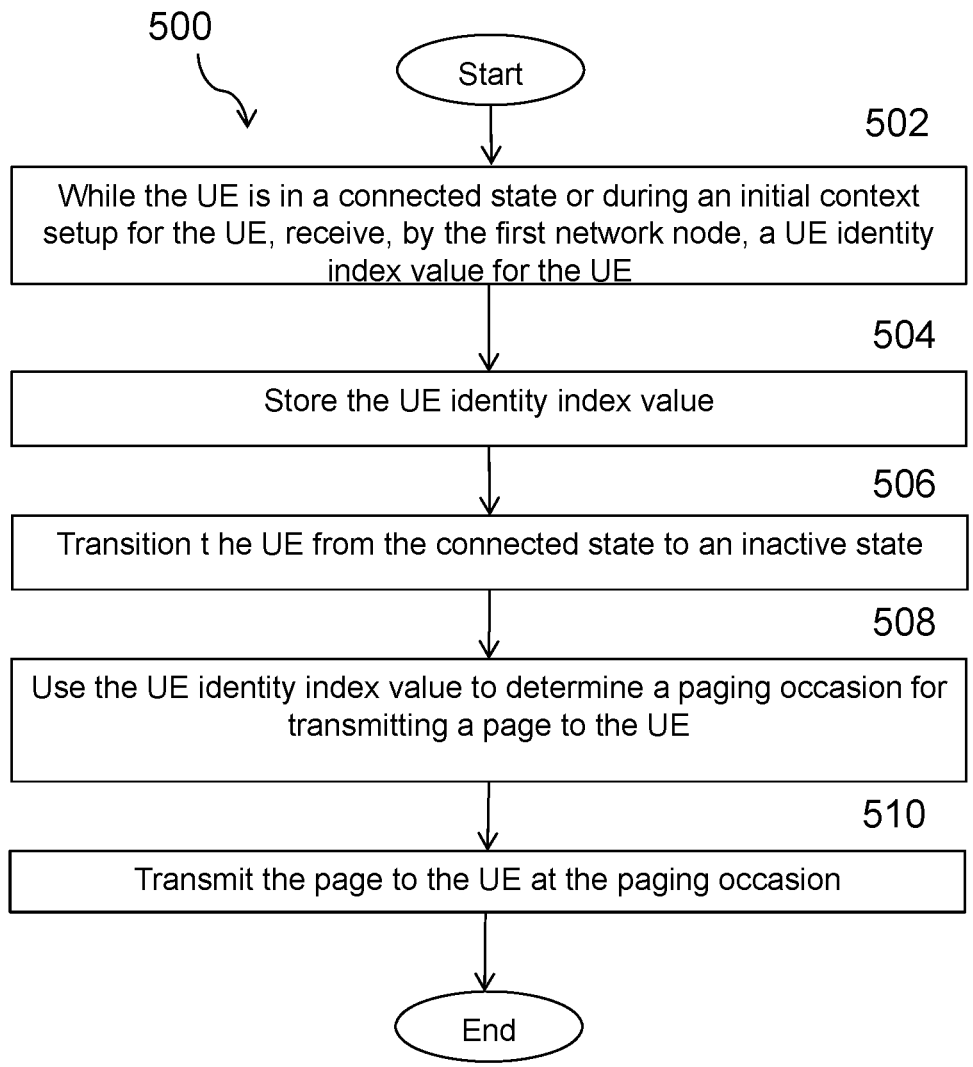
FIG. 5 illustrates an exemplary method by a network node for enabling paging of a UE in an inactive state, according to certain embodiments.

FIG. 5 illustrates an example method 500 by a first network node 204A for enabling paging of a UE 110 in an inactive state, according to certain embodiments. The method begins at step 502 when the first network node 204A receives a UE identity index value for the UE while the UE is in a connected state or during an initial context setup for the UE.

In a particular embodiment, the connected state is a lightly connected state such as that described in TS 38.300, ver. 101, section 9.2.2.1, which states:

RRC_INACTIVE is a state where a UE remains in CM-CONNECTED and can move within an area configured by NG-RAN (the RNA) without notifying NG-RAN. In RRC_INACTIVE, the last serving NG-RAN node keeps the UE context and the UE-associated NG connection with the serving AMF and UPF. The UE notifies the network if it moves out of the configured RNA.

In another embodiment, the lightly connected state may be a state where a UE 110 remains in ECM-CONNECTED and can move within a Radio Notification Area (RNA) configured by RAN without notifying RAN. In the lightly connected state, the last serving RAN node may keep the UE context and the UE-associated connection with the serving MME, such as core node 202. UE 110 may notify the network if the UE 110 moves out of the configured RNA.

In a particular embodiment, the UE identity index value may be received at step 502 in a message from core network node 202. For example, the UE identity index value may be received in a handover request, an initial context setup request, a downlink NAS transport message, or a Path Switch Request Acknowledge message. In another embodiment, the UE identity index value may be received from the UE 110. In still another embodiment, the UE identity index value may be received from a second network node 204A, such as where the first network node is a target base station and the second network node 204B is a source base station in a handover of UE 110 from second network node 204B to first network node 204A. In a particular embodiment, the UE identity index value may be received from the second network node 204B over an X2 interface 206 between first network node 204A and second network node 204B.

At step 504, the first network node 204A stores the UE identity index value. According to certain embodiments, the UE identity index value may include an International Mobile Subscriber Identity (IMSI), a portion of an IMSI, or a checksum derived from the IMSI. In a particular embodiment, the UE identity index value may be stored with a UE context indicating the state of the UE 110 as being connected.

At step 506, the first network node 204A transitions the UE 110 from the connected state to an inactive state. In a particular embodiment, for example, first network node 204A may transmit a suspend or release message to the UE 110. The suspend or release message may order UE 110 to enter the inactive state or a sleep state.

At step 508, the first network node 204A uses the UE identity index value to determine a paging occasion for transmitting a page to UE 110. First network node 204A may then transmit the page to UE 110 at the paging occasion at step 510.

In a particular embodiment, first network node 204A may provide the UE identity index value to a second network node 204B for the transmission of the page from second network node 204B. In a particular embodiment, for example, first network node 204A may provide the UE identity index value to second network node 204B in a paging request. In a particular embodiment, the UE identity index value may be transmitted to the second network node 204B over an X2 interface between first network node 204A and second network node 204B.

Though not depicted in FIG. 5, in a particular embodiment, first network node 204A may additionally or alternatively provide the UE identity index value to second network node 204B while UE 110 is still in the connected state. Thus, in a particular embodiment, first network node 204A may provide the UE identity index value to second network node 204B before the UE is transitioned into the inactive state. The UE identity index value may be transmitted in a message that includes a handover request or a response to a UE context request from the second network node 204B, in particular embodiments.

Figure 6:
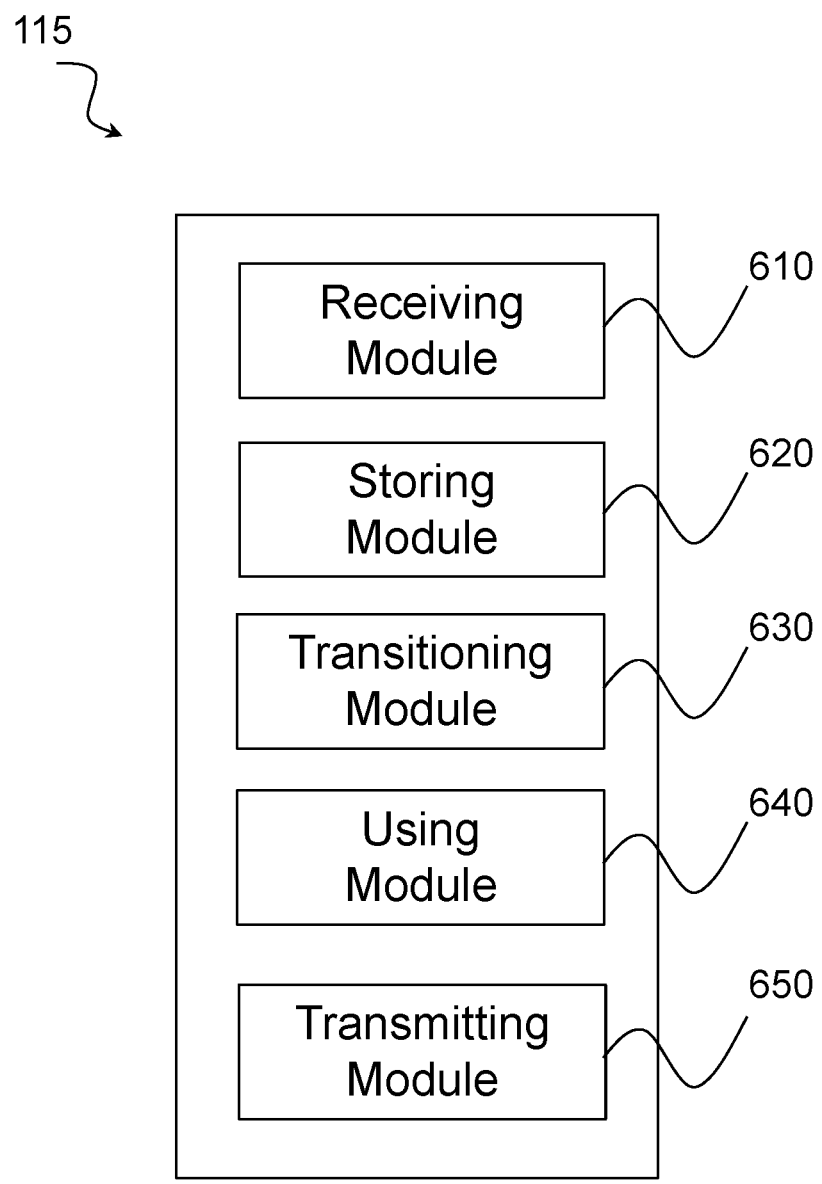
FIG. 6 illustrates an example computer networking virtual apparatus for enabling paging of a UE in an inactive state, according to certain embodiments.

In certain embodiments, the method by a first network node 204A for enabling paging of a UE 110 in an inactive state, as described above may be performed by a computer networking virtual apparatus. FIG. 6 illustrates an example computer networking virtual apparatus 600 for enabling paging of a UE 110 in an inactive state, according to certain embodiments. In certain embodiments, virtual computing device 600 may include modules for performing steps similar to those described above with regard to the method illustrated and described in FIG. 5. For example, computer networking virtual apparatus 600 may include a receiving module 610, a storing module 620, a transitioning module 630, a using module 640, a transmitting module 650, and any other suitable modules for enabling paging of a UE 110 in an inactive state. In some embodiments, one or more of the modules may be implemented using one or more processors 125 of FIG. 1 or processing circuitry 420 of FIG. 4. In certain embodiments, the functions of two or more of the various modules may be combined into a single module.

The receiving module 610 may perform the receiving functions of computer networking virtual apparatus 600. For example, in a particular embodiment, receiving module 610 may receive a UE identity index value for UE 110 while UE 110 is in a connected state or during an initial context setup for UE 110.

The storing module 620 may perform the storing functions of computer networking virtual apparatus 600. For example, in a particular embodiment, storing module 620 may store the UE identity index value.

The transitioning module 630 may perform the transitioning functions of computer networking virtual apparatus 600. For example, in a particular embodiment, transitioning module 630 may transition UE 110 from the connected state to an inactive state.

The using module 640 may perform the using functions of computer networking virtual apparatus 600. For example, in a particular embodiment, using module 640 may use the UE identity index value to determine a paging occasion for transmitting a page to UE 110.

The transmitting module 650 may perform the transmitting functions of computer networking virtual apparatus 600. For example in a particular embodiment, transmitting module 650 may transmit the page to UE 110 at the paging occasion.

Other embodiments of computer networking virtual apparatus 600 may include additional components beyond those shown in FIG. 6 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 7:
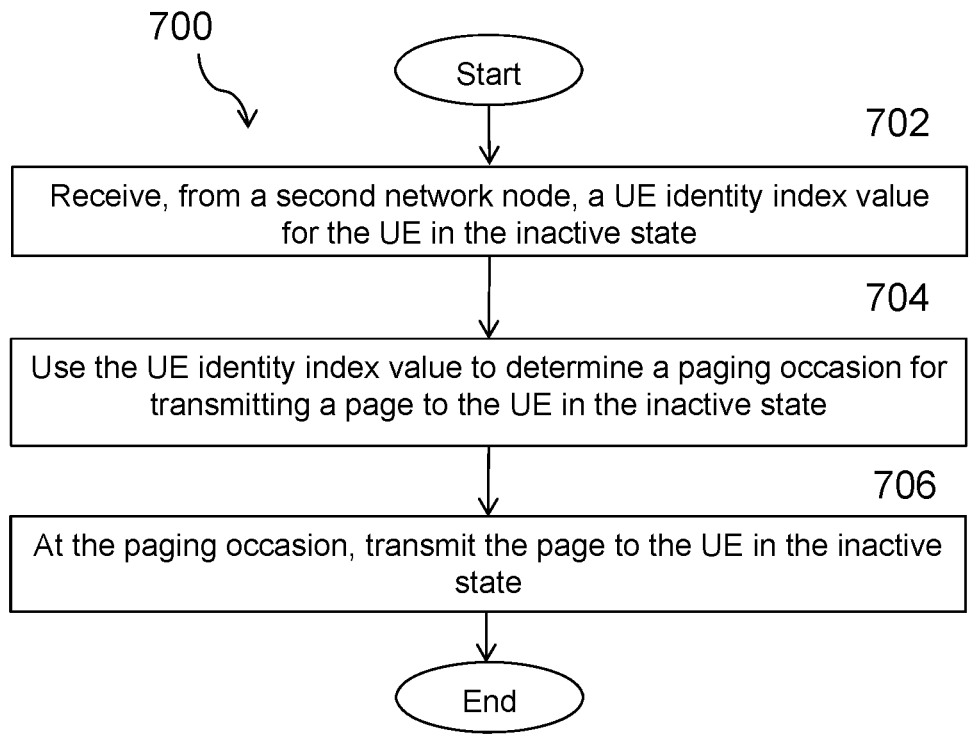
FIG. 7 illustrates another exemplary method by a network node for enabling paging of a UE in an inactive state, according to certain embodiments.

FIG. 7 illustrates another example method 700 by a first network node 204B for enabling paging of a UE 110 in an inactive state, according to certain embodiments. The method begins at step 702 when the first network node 204B receives, from a second network node 204A a UE identity index value for the UE 110 in the inactive state. In a particular embodiment, the UE identity index value is an IMSI, a portion of an IMSI, or a checksum derived from the IMSI. In a particular embodiment, the UE identity index value is received from the second network node over an X2 interface. In a particular embodiment the UE identity index value may be received with a paging request from the second network node 204A. At step 704, first network node 204B uses the UE identity index value to determine a paging occasion for transmitting a page to UE 110 in the inactive state. The first network node 204B transmits, at the paging occasion, the page to the UE 110 in the inactive state, at step 706.

Figure 8:
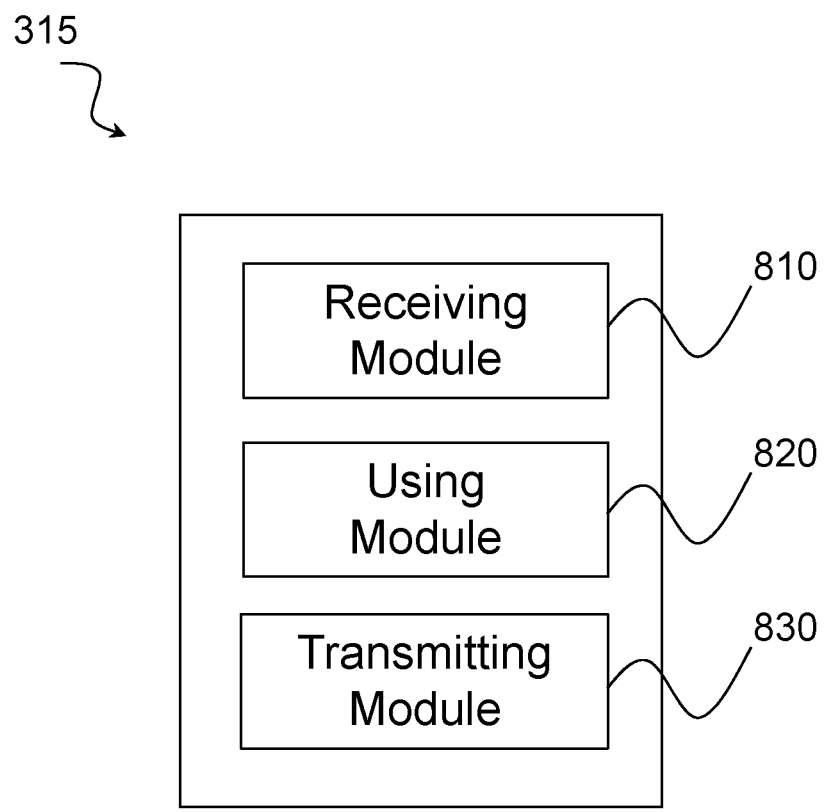
FIG. 8 illustrates another example computer networking virtual apparatus for enabling paging of a UE in an inactive state, according to certain embodiments.

In certain embodiments, the method by a first network node 204B for enabling paging of a UE 110 in an inactive state, as described above may be performed by a computer networking virtual apparatus. FIG. 8 illustrates an example computer networking virtual apparatus 800 for enabling paging of a UE 110 in an inactive state, according to certain embodiments. In certain embodiments, virtual computing device 800 may include modules for performing steps similar to those described above with regard to the method illustrated and described in FIG. 7. For example, computer networking virtual apparatus 800 may include a receiving module 810, a using module 820, a transmitting module 830, and any other suitable modules for enabling paging of UE 110 in an inactive state. In some embodiments, one or more of the modules may be implemented using one or more processors 125 of FIG. 1 or processing circuitry 420 of FIG. 4. In certain embodiments, the functions of two or more of the various modules may be combined into a single module.

The receiving module 810 may perform the receiving functions of computer networking virtual apparatus 800. For example, in a particular embodiment, receiving module 810 may receive a UE identity index value for UE 110 while UE 110 is in the inactive state.

The using module 820 may perform the using functions of computer networking virtual apparatus 800. For example, in a particular embodiment, using module 820 may use the UE identity index value to determine a paging occasion for transmitting a page to UE 110.

The transmitting module 830 may perform the storing functions of computer networking virtual apparatus 800. For example, in a particular embodiment, transmitting module 830 may transmit the page to UE 110 in the inactive state at the paging occasion.

Other embodiments of computer networking virtual apparatus 800 may include additional components beyond those shown in FIG. 8 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

FIG. 9 illustrates an example UE 110 for receiving a page while the UE 110 is in an inactive state, in accordance with certain embodiments. As depicted, UE 110 is an example wireless device. UE 110 includes an antenna 905, radio front-end circuitry 910, processing circuitry 915, and a computer-readable storage medium 930. Antenna 905 may include one or more antennas or antenna arrays, and is configured to send and/or receive wireless signals, and is connected to radio front-end circuitry 910. In certain alternative embodiments, UE 110 may not include antenna 905, and antenna 905 may instead be separate from UE 110 and be connectable to UE 110 through an interface or port.

The radio front-end circuitry 910 may comprise various filters and amplifiers, is connected to antenna 905 and processing circuitry 915, and is configured to condition signals communicated between antenna 905 and processing circuitry 915. In certain alternative embodiments, UE 110 may not include radio front-end circuitry 910, and processing circuitry 915 may instead be connected to antenna 905 without radio front-end circuitry 910.

Processing circuitry 915 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 915 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 915 executing instructions stored on a computer-readable storage medium 930. In alternative embodiments, some or all of the functionality may be provided by the processing circuitry 915 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 915 alone or to other components of UE 110, but are enjoyed by the UE as a whole, and/or by end users and the wireless network generally.

Antenna 905, radio front-end circuitry 910, and/or processing circuitry 915 may be configured to perform any receiving operations described herein as being performed by a UE 110. Any information, data and/or signals may be received from a network node and/or another UE 110.

The processing circuitry 915 may be configured to perform any determining operations described herein as being performed by a UE 110. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 905, radio front-end circuitry 910, and/or processing circuitry 915 may be configured to perform any transmitting operations described herein as being performed by a UE 110. Any information, data and/or signals may be transmitted to a network node 115, 204A-B and/or another UE 110.

Computer-readable storage medium 930 is generally operable to store instructions, such as a computer program, software, an application including one or more of logic, rules, code, tables, etc. and/or other instructions capable of being executed by a processor. Examples of computer-readable storage medium 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 915. In some embodiments, processing circuitry 915 and computer-readable storage medium 930 may be considered to be integrated.

Alternative embodiments of UE 900 may include additional components beyond those shown in FIG. 9 that may be responsible for providing certain aspects of the UE's functionality, including any of the functionality described herein and/or any functionality necessary to support the solution described above. As just one example, UE 110 may include input interfaces, devices and circuits, and output interfaces, devices, and circuits. Input interfaces, devices, and circuits are configured to allow input of information into UE 110, and are connected to processing circuitry 915 to allow processing circuitry 915 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 110, and are connected to processing circuitry 915 to allow processing circuitry 915 to output information from UE 110. For example, output interfaces, devices, or circuits may include a speaker, a display, vibrating circuitry, a USB port, a headphone interface, or other output elements. Using one or more input and output interfaces, devices, and circuits, UE 110 may communicate with end users and/or the wireless network, and allow them to benefit from the functionality described herein.

As another example, UE 110 may include power source 935. Power source 935 may comprise power management circuitry. Power source 935 may receive power from a power supply, which may either be comprised in, or be external to, power source 935. For example, UE 110 may comprise a power supply in the form of a battery or battery pack which is connected to, or integrated in, power source 935. Other types of power sources, such as photovoltaic devices, may also be used. As a further example, UE 110 may be connectable to an external power supply (such as an electricity outlet) via an input circuitry or interface such as an electrical cable, whereby the external power supply supplies power to power source 935. Power source 935 may be connected to radio front-end circuitry 910, processing circuitry 915, and/or computer-readable storage medium 930 and be configured to supply UE 110, including processing circuitry 915, with power for performing the functionality described herein.

UE 110 may also include multiple sets of processing circuitry 915, computer-readable storage medium 930, radio circuitry 910, and/or antenna 905 for different wireless technologies integrated into UE 110, such as, for example, GSM, WCDMA, LTE, NR, Wi-Fi, or Bluetooth wireless technologies. These wireless technologies may be integrated into the same or different chipsets and other components within UE 110.

Other embodiments of UE 110 may include additional components beyond those shown in FIG. 9 that may be responsible for providing certain aspects of the wireless device's functionality, including any of the functionality described above and/or any additional functionality (including any functionality necessary to support the solution described above).

Figure 10:
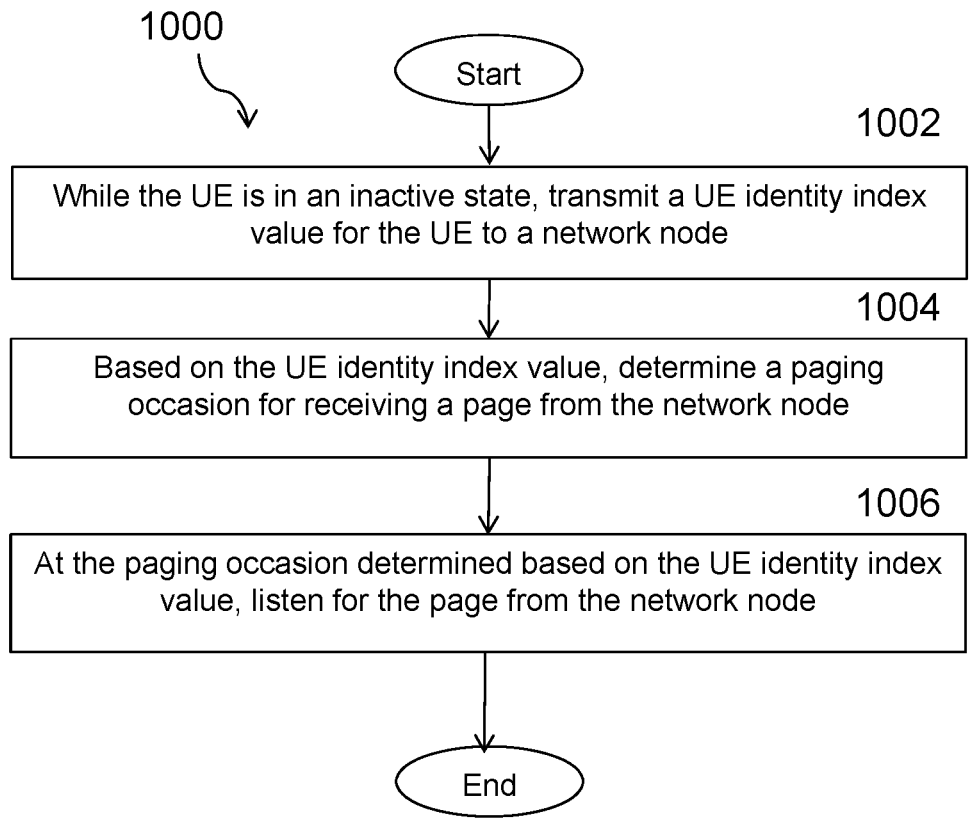
FIG. 10 illustrates an exemplary method by a UE for receiving a page while in an inactive state, in accordance with certain embodiments.

FIG. 10 illustrates an exemplary method 1000 by a UE 110 for receiving a page while in an inactive state, in accordance with certain embodiments. The method begins at step 1002 when, while in a connected state, UE 110 transmits a UE identity index value to a network node 204A-B. In a particular embodiment the UE identity index value includes an IMSI, a portion of an IMSI, or a checksum derived from the IMSI. Thereafter, UE 110 may be transitioned into an inactive state At step 1004, and while the UE 110 is in the inactive state, UE 110 determines a paging occasion for receiving a page from network node 204A-B based on the UE identity index value.

At step 1006, UE 110 listens for the page from network node 204A-B at the paging occasion. In a particular embodiment, UE 110 may receive a page from network node 204A-B during the paging occasion.

Figure 11:
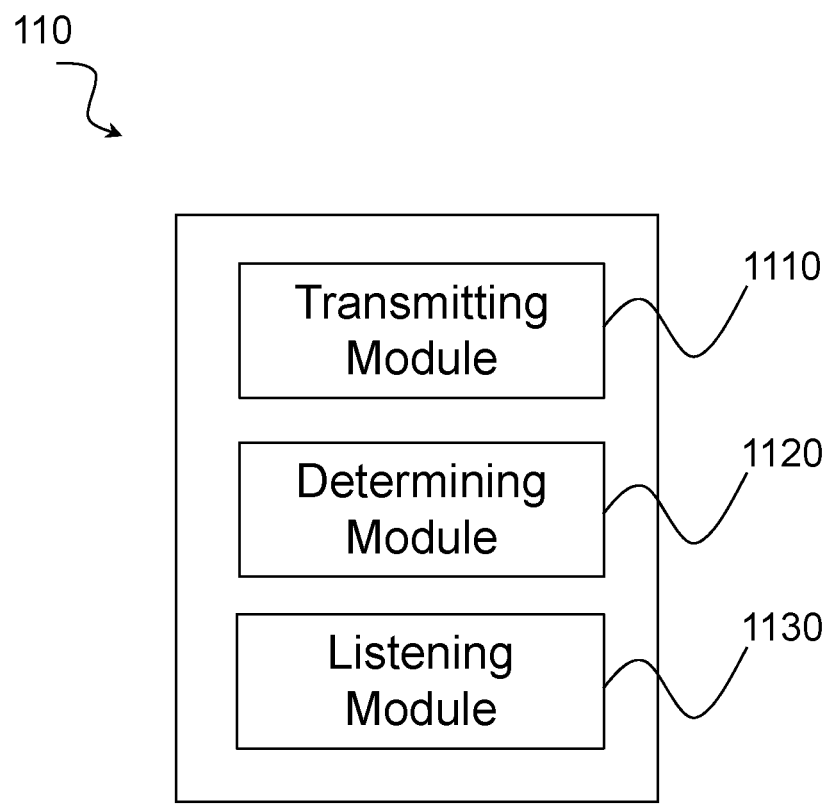
FIG. 11 illustrates a exemplary computer networking virtual apparatus for receiving a page while in an inactive state, in accordance with certain embodiments.

In certain embodiments, the method for receiving a page while in an inactive state as described above may be performed by a computer networking virtual apparatus. FIG. 11 illustrates an example virtual computing device 1100 for receiving a page while in an inactive state, according to certain embodiments. In certain embodiments, virtual computing device 1100 may include modules for performing steps similar to those described above with regard to the method illustrated and described in FIG. 10. For example, virtual computing device 1100 may include a transmitting module 1102, a determining module 1104, a listening module 1106, and any other suitable modules for receiving a page while in an inactive state. In some embodiments, one or more of the modules may be implemented using one more processors 145 of FIG. 1 or processing circuitry 915 of FIG. 9. In certain embodiments, the functions of two or more of the various modules may be combined into a single module.

The transmitting module 1102 may perform the transmitting functions of virtual computing device 1100. For example, in a particular embodiment, transmitting module 1102 may transmit a UE identity index value to a network node 204A-B while the UE is in a connected state. Thereafter, UE 110 may be transitioned into an inactive state.

The determining module 1104 may perform the determining functions of virtual computing device 1100. For example, in a particular embodiment, determining module 1104 may determine, while the UE 110 is in the inactive state, a paging occasion for receiving a page from network node 204A-B based on the UE identity index value.

The listening module 1106 may perform the listening functions of virtual computing device 1100. For example, in a particular embodiment, listening module 1106 may listen for the page from network node 204A-B at the paging occasion.

Other embodiments of virtual computing device 1100 may include additional components beyond those shown in FIG. 11 that may be responsible for providing certain aspects of the wireless device's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

FIG. 12 illustrates an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 1200 includes processing circuitry 1220, memory 1230, and network interface 1240. In some embodiments, processing circuitry 1220 executes instructions to provide some or all of the functionality described above as being provided by the network node, memory 1230 stores the instructions executed by processing circuitry 1220, and network interface 1240 communicates signals to any suitable node, such as a gateway, switch, router, Internet, Public Switched Telephone Network (PSTN), network nodes 115, radio network controllers or core network nodes 1200, etc.

Processing circuitry 1220 may include any suitable combination of hardware and software implemented in one or more modules to execute instructions and manipulate data to perform some or all of the described functions of the radio network controller or core network node 1200. In some embodiments, processing circuitry 1220 may include, for example, one or more computers, one or more central processing units (CPUs), one or more microprocessors, one or more applications, and/or other logic.

Memory 1230 is generally operable to store instructions, such as a computer program, software, an application including one or more of logic, rules, algorithms, code, tables, etc. and/or other instructions capable of being executed by a processor. Examples of memory 1230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 1240 is communicatively coupled to processing circuitry 1220 and may refer to any suitable device operable to receive input for the network node, send output from the network node, perform suitable processing of the input or output or both, communicate to other devices, or any combination of the preceding. Network interface 1240 may include appropriate hardware (e.g., port, modem, network interface card, etc.) and software, including protocol conversion and data processing capabilities, to communicate through a network.

Other embodiments of the network node may include additional components beyond those shown in FIG. 12 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage 130, storage 150, memory 430, and/or storage 930 may comprise computer readable means on which a computer program can be stored. The computer program may include instructions which cause any of the above-described processors or processing circuitry (and any operatively coupled entities and devices, such as interfaces and storage) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by any of the above-described processors, possibly in cooperation with any one of the above-described storage components. Processors, processing circuitry, storage, and memory may thus be arranged to allow processors and/or processing circuitry to fetch instructions from storage and/or memory and execute the fetched instructions to allow the respective functional module to perform any steps or functions disclosed herein.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Accordingly, the above description of the embodiments does not constrain this disclosure. Other changes, substitutions, and alterations are possible without departing from the spirit and scope of this disclosure, as defined by the following claims.

The invention claimed is:

1. A method by a first network node for enabling paging of a user equipment, UE, in an inactive state, the method comprising:
while the UE is in a connected state or during an initial context setup for the UE, receiving, by the first network node, a UE identity index value for the UE;
storing the UE identity index value;
prior to transitioning the UE to the inactive state and while the UE is in a connected state, transmitting, by the first network node, the UE identity index value to a second network node;
transitioning the UE from the connected state to an inactive state;
using the UE identity index value to determine a paging occasion for transmitting a page to the UE; and
transmitting the page to the UE at the paging occasion.

2. The method of claim 1, wherein the connected state comprises a lightly connected state.

3. The method of claim 1, wherein the UE identity index value comprises:
an International Mobile Subscriber Identity, IMSI;
a portion of an IMSI; or
a checksum derived from the IMSI.

4. The method of claim 1, wherein storing the UE identity index value comprises storing the UE identity index value with a UE context indicating a state of the UE as being connected.

5. The method of claim 1, wherein the UE identity index value is received in a message from the UE.

6. The method of claim 1, wherein the UE identity index value is received in a message from a core network node, the message comprising at least one of:
a handover request;
an initial context setup request;
a downlink NAS transport message; and
a Path Switch Request Acknowledge message.

7. The method of claim 1, further comprising:
transmitting, by the first network node, the UE identity index value to a second network node for transmission of the page to the UE by the second network node.

8. The method of claim 7, wherein the UE identity index value is transmitted to the second network node in a paging request.

9. The method of claim 1, wherein the UE identity index value is transmitted to the second network node in a message, the message comprising:
a handover request; or
a response to a UE context request from the second network node.

10. The method of claim 1 wherein the first network node is a target network node and the UE identity index value for the UE is received from a source network node.

11. The method of claim 1, wherein the UE identity index value is received by the first network node or transmitted to the second network node over an X2 interface.

12. The method of claim 1, wherein transitioning the UE from the connected state to the inactive state comprises:
transmitting a suspend or release message to the UE, the suspend or release message ordering the UE to enter the inactive state or a sleep state.

13. A first network node for enabling paging of a user equipment, UE, in an inactive state, the network node comprising:
memory storing instructions; and
processing circuitry configured to execute the instructions to cause the first network node to:
while the UE is in a connected state or during an initial context setup for the UE, receive a UE identity index value for the UE;
store the UE identity index value;
prior to transitioning the UE to the inactive state and while the UE is in a connected state, transmit the UE identity index value to a second network node;
transition the UE from the connected state to an inactive state;
use the UE identity index value to determine a paging occasion for transmitting a page to the UE; and
transmit the page to the UE at the paging occasion.

14. The first network node of claim 13, wherein the connected state comprises a lightly connected state.

15. The first network node of claim 13, wherein the UE identity index value comprises:
an International Mobile Subscriber Identity, IMSI;
a portion of an IMSI; or
a checksum derived from the IMSI.

16. The first network node of claim 13, wherein storing the UE identity index value comprises storing the UE identity index value with a UE context indicating a state of the UE as being connected.

17. The first network node of claim 13, wherein the UE identity index value is received in a message from the UE.

18. The first network node of claim 13, wherein the UE identity index value is received in a message from a core network node, the message comprising at least one of:
a handover request;
an initial context setup request;
a downlink NAS transport message; and
a Path Switch Request Acknowledge message.

19. The first network node of claim 13, wherein the processing circuitry is further configured to execute the instructions to cause the first network node to:
transmit the UE identity index value to a second network node for transmission of the page to the UE by the second network node.

20. The first network node of claim 19, wherein the UE identity index value is transmitted to the second network node in a paging request.

21. The first network node of claim 13, wherein the UE identity index value is transmitted to the second network node in a message, the message comprising:
- a handover request; or
- a response to a UE context request from the second network node.

22. The first network node of claim 13 wherein the first network node is a target network node and the UE identity index value for the UE is received from a source network node.

23. The first network node of claim 13, wherein the UE identity index value is received by the first network node or transmitted to the second network node over an X2 interface.

24. The first network node of claim 13, wherein transitioning the UE from the connected state to the inactive state comprises:
- transmitting a suspend or release message to the UE, the suspend or release message ordering the UE to enter the inactive state or a sleep state.

* * * * *